(12) United States Patent
Ebner et al.

(10) Patent No.: US 9,619,926 B2
(45) Date of Patent: Apr. 11, 2017

(54) METHOD AND DEVICE FOR GENERATING A 3D REPRESENTATION OF A USER INTERFACE IN A VEHICLE

(75) Inventors: André Ebner, Ingolstadt (DE); Mathias Halliger, Kipfenberg (DE); Stefan Roedlmeier, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/371,388

(22) PCT Filed: Apr. 28, 2012

(86) PCT No.: PCT/EP2012/001838
§ 371 (c)(1),
(2), (4) Date: Aug. 11, 2014

(87) PCT Pub. No.: WO2013/104378
PCT Pub. Date: Jul. 18, 2013

(65) Prior Publication Data
US 2015/0062118 A1 Mar. 5, 2015

(30) Foreign Application Priority Data
Jan. 9, 2012 (DE) ........................ 10 2012 001 036

(51) Int. Cl.
| | |
|---|---|
| G06T 11/00 | (2006.01) |
| G06T 15/10 | (2011.01) |
| B60K 37/06 | (2006.01) |
| G06F 3/0481 | (2013.01) |
| G06F 3/0482 | (2013.01) |

(52) U.S. Cl.
CPC .............. *G06T 15/10* (2013.01); *B60K 37/06* (2013.01); *G06F 3/0482* (2013.01); *G06F 3/04815* (2013.01); *B60K 2350/1004* (2013.01)

(58) Field of Classification Search
None
See application file for complete search history.

(56) References Cited

U.S. PATENT DOCUMENTS

| | | | |
|---|---|---|---|
| 6,369,701 B1 | 4/2002 | Yoshida et al. | |
| 7,562,312 B2 * | 7/2009 | Rochford et al. | ............ 715/848 |
| 8,239,772 B2 * | 8/2012 | Fujioka | ................. G06F 3/0481 |
| | | | 715/745 |

(Continued)

FOREIGN PATENT DOCUMENTS

| | | |
|---|---|---|
| CN | 101160225 | 4/2008 |
| CN | 102207770 | 10/2011 |

(Continued)

OTHER PUBLICATIONS

International Search Report mailed Nov. 27, 2012 for corresponding International Patent Application No. PCT/EP2012/001838, 4 pages.

(Continued)

*Primary Examiner* — Andrew G Yang
(74) *Attorney, Agent, or Firm* — Staas & Halsey LLP

(57) ABSTRACT

A method for generating a 3D representation of a user interface in a vehicle, in which a scene, in particular a moving scene, containing at least one 3D object is rendered by a computing device inside the vehicle in order to determine the 3D representation.

19 Claims, 3 Drawing Sheets

(56) References Cited

U.S. PATENT DOCUMENTS

| | | | | |
|---|---|---|---|---|
| 2001/0030667 | A1* | 10/2001 | Kelts | G06F 3/0481 715/854 |
| 2004/0155907 | A1* | 8/2004 | Yamaguchi | G06F 3/0481 715/810 |
| 2006/0288308 | A1* | 12/2006 | Enomoto et al. | 715/811 |
| 2007/0164989 | A1 | 7/2007 | Rochford et al. | |
| 2008/0122837 | A1* | 5/2008 | Woo | G06F 9/4443 345/419 |
| 2008/0161997 | A1* | 7/2008 | Wengelnik et al. | 701/36 |
| 2009/0164923 | A1* | 6/2009 | Ovi | G06F 3/0482 715/764 |
| 2009/0189373 | A1* | 7/2009 | Schramm | B60K 35/00 280/731 |
| 2010/0088628 | A1* | 4/2010 | Flygh et al. | 715/779 |
| 2010/0333030 | A1* | 12/2010 | Johns | G06F 3/04815 715/834 |
| 2011/0047484 | A1* | 2/2011 | Mount | G06Q 10/10 715/753 |
| 2011/0138295 | A1* | 6/2011 | Momchilov | G06F 9/4445 715/740 |
| 2011/0153198 | A1 | 6/2011 | Kokkas et al. | |
| 2011/0242102 | A1* | 10/2011 | Hess | 345/419 |
| 2011/0271235 | A1* | 11/2011 | Doyen | G06F 3/04845 715/863 |
| 2011/0282537 | A1* | 11/2011 | Yamasaki et al. | 701/29 |

FOREIGN PATENT DOCUMENTS

| | | |
|---|---|---|
| DE | 10 2007 039 442 A1 | 2/2009 |
| DE | 10 2007 063 049 A1 | 7/2009 |
| DE | 10 2008 026 336 A1 | 12/2009 |
| DE | 10 2010 022 620 A1 | 12/2011 |
| DE | 10 2012 001 036.2 | 1/2012 |
| WO | WO 2006/108617 A2 | 10/2006 |
| WO | PCT/EP2012/001838 | 4/2012 |

OTHER PUBLICATIONS

WIPO English language translation of International Preliminary Report on Patentability, downloaded from WIPO website on Jul. 9, 2014.

WIPO provided English Translation of the International Preliminary Report on Patentability mailed Jul. 17, 2014 for corresponding International Patent Application No. PCT/EP2012/001838.

Chinese Office Action dated Dec. 31, 2015 in corresponding Chinese Patent Application No. 201280066376.1.

* cited by examiner

METHOD AND DEVICE FOR GENERATING A 3D REPRESENTATION OF A USER INTERFACE IN A VEHICLE

CROSS REFERENCE TO RELATED APPLICATIONS

This application is based on and hereby claims priority to International Application No. PCT/EP2012/001838 filed on Apr. 28, 2012 and German Application No. 10 2012 001 036.2 filed on Jan. 9, 2012, the contents of which are hereby incorporated by reference.

BACKGROUND

The invention relates to a method for generating a 3D representation of a user interface in a vehicle and to a corresponding device in a vehicle.

Vehicles have always provided different adjustment options for different vehicle systems, which are implemented using special operating elements, for example. However, large-area display devices, in particular displays, are being used more and more frequently in modern motor vehicles, in which case the available computing power is also increased. It is therefore possible and has already been proposed to use graphical user interfaces in vehicles, which can be displayed on the displays, for example, and/or guide a user through different adjustment options in a menu-controlled manner.

In this case, the adjustment options and functionalities provided are also becoming more and more extensive and sophisticated. In addition to established radio functions and the playback of digital media, it is also known to implement Bluetooth telephony as well as dead reckoning with corresponding map display, for example. Driver assistance systems which are being implemented more and more also provide adjustment options. Another proposed possibility for extending the operating and information range is the use of contents outside the vehicle, for example from the Internet. An infotainment system inside the vehicle can therefore be wirelessly connected to an external information source, for example with respect to map functions. Satellite images and special representations can therefore be retrieved from the Internet.

Systems having such user interfaces which are known nowadays, generally infotainment systems and man-machine interfaces (MMIs), nowadays usually use only two-dimensional representations, for example lists, icons or vehicle sketches, or resort to 3D representations which are precalculated (rendered) outside the vehicle and are displayed in the form of two-dimensional graphics and/or animations.

This results in some disadvantages. With the previous approach, it is thus not possible or is possible only with great difficulty to visualize complex, spatial relationships, for example the location of functions in the vehicle. 3D representations or sequences precalculated outside the vehicle require a large amount of storage space and provide only little flexibility or no flexibility at all since only a limited number of possible variants can be rendered in advance.

SUMMARY

Therefore, one possible object relates to specifying a visualization possibility which is improved in comparison therewith.

In order to achieve this object, in a method for generating a 3D representation of a user interface in a vehicle, the inventors propose for a scene, in particular a moving scene, containing at least one 3D object to be rendered by a computing device inside the vehicle in order to determine the 3D representation.

The inventors therefore propose, in particular for more expensive vehicles in order to meet the demand for premium quality and innovation, the practice of implementing a three-dimensional display completely inside the vehicle, in particular inside the vehicle infotainment systems. A moving, that is to say animated, representation is also particularly preferred in this case. Therefore, the previously conventional 2D representation on a user interface in the vehicle is extended with a real-time 3D rendering or is replaced with the latter. The 3D representations (3D sequences in the case of animated images) are not precalculated outside the motor vehicle but rather are generated in real time during use (the operating process) on the basis of corresponding scenes which correspond to 3D models.

In this case, within the scope of the proposals, a scene can also be understood as meaning a virtual spatial model which comprises the three-dimensional position and material properties of at least one 3D object, at least one light source and the position and viewing direction of at least one observer. During rendering, the three-dimensional scene is then imaged onto a two-dimensional image plane, thus obtaining a 3D representation which can be displayed on a display device of the vehicle, in particular a display. At least one computer program, in particular a renderer, can be provided for this purpose on the computing device which is part of an infotainment system, in particular. It is preferred if at least 15 representations per second can be determined within moving scenes, in particular.

The use of 3D representations at least as part of user interfaces therefore allows operating sequences to be visualized in a clearly comprehensible manner for an occupant of the vehicle, for example by the 3D visualization of a function in the vehicle in addition to a purely textual functional designation. On the other hand, the "joy of use" of the system can be considerably increased by new possibilities in the field of user interface design (GUI design).

The proposed method uses the fact that higher computing powers are usually available in modern motor vehicles and now also allow real-time rendering in situ and in the process relieve the load on storage devices, for example, in which possibly prerendered 3D representations would otherwise have to be held, and increase the flexibility. Within the scope of the proposals, a 3D representation can be rendered solely for the purposes of display.

One particularly advantageous refinement may provide, when performing at least one operating action, for the scene to be changed and for the 3D representation to be rendered again, in particular in real time. Operating actions by a user therefore result in the 3D representation being changed. In this case, at least one change of at least one 3D object, in particular a spatial transformation, and/or a defined arrangement (and possibly movement) of the 3D objects in the scene is/are respectively assigned to at least some of the possible operating actions, for example. It goes without saying that changes in the perspective, the illumination and the like may also accordingly be assigned to operating actions. Corresponding assignments may be stored in a storage device of the computing device. After an operating action, the computing device therefore compiles the scene according to the specifications, renders the scene and represents it on a display device or generates a movement in the scene, with the result that a 3D sequence is then ultimately produced.

In order to change the scene, provision can therefore be made for at least one of the at least one 3D object to be rotated and/or translated and/or scaled and/or adapted in terms of its opacity and/or for at least one 3D object to be added or removed. Defined, spatial transformations may therefore be applied to the stored 3D models of the elements to be represented, therefore the 3D objects, for corresponding operating requirements of the driver, inter alia by scaling, rotation and translation, in which case it is also conceivable to entirely remove or add 3D objects for particular operating actions or in the case of particular display states. The current spatial scene is respectively imaged onto the two-dimensional image plane in real time and is represented on the display device, in particular the display. Corresponding illumination models and variable opacities can also be taken into account.

As already stated, it is generally preferred and expedient in the method to also depict a movement in the 3D representation, in particular within the scope of a change of representation in the event of an operating action and/or as a representation fundamentally having animated 3D objects. For example, a telephone receiver symbol can be displayed in a shaking manner and the like, and the 3D objects can be shifted with respect to one another, for example in a circle in the case of a menu, if other elements are selected.

In order to represent a menu, one specific refinement may provide for a 3D object in the scene to be used for each menu item. The proposals can therefore be applied to a menu. Instead of making the selection using two-dimensional lists or two-dimensional icons, as conventional, the proposals may also provide for a 3D representation to be selected in which 3D objects are assigned to menu items. The 3D objects assigned to the menu items are rendered in real time by the on-board computing device. In this case, as already stated, the 3D objects can be rotated, scaled or translated, for example. Symbols or else three-dimensional bodies provided with symbols and/or icons and/or text, for example, can be used as the 3D objects, for example.

A development of this refinement may provide for a preview object, in particular a 3D texture, which is incorporated in the 3D scene, in particular in a screen-like manner, to be used for a currently selected menu item, which preview object comprises a two-dimensional preview of the user interface after selection of the menu item. This therefore makes it possible to integrate a preview in the three-dimensional representation, in which preview a submenu or a function to be selected can be represented as a 3D texture in the selection menu, for example. The preview object can be considered to be a type of "screen", onto which the appearance of the user interface is projected when selecting a menu item which has just been selected. In this case, the preview object can be fundamentally arranged, illuminated or transformed in any desired manner in space, in which case, in a particularly expedient refinement, the preview object can be arranged behind the currently selected menu item, that is to say the menu item in focus, from the viewing direction of the scene.

In this case, a first embodiment may provide for the preview to be calculated on the basis of up-to-date data during representation and to be kept up-to-date, in particular during the representation time. In this variant which is preferred, up-to-date data are therefore evaluated in order to determine the preview, as would then also be actually displayed. With regard to a navigation map, this means, for example, that the map representation relates to the current environment of the motor vehicle. In order to determine the preview, routines of the corresponding function can be accessed in this case. The preview is also advantageously continuously kept up-to-date, which is also possible without any problems on account of the real-time rendering provided.

However, in a second embodiment, it is alternatively also conceivable for a stored representation which was displayed during the last use of the functionality associated with the currently selected menu item to be used as the preview or for a stored default representation to be used as the preview if the menu item has not yet been selected. It is therefore also conceivable for the preview to have been stored as a type of "screenshot" during previous use and for a default image which is stored in a storage device to be used when the functionality has not yet been called.

Another specific refinement may provide for an image of the vehicle to be used as a 3D object. This makes it possible to represent relationships with respect to the motor vehicle in a particularly intuitive manner since the image can be rotated, scaled and at least partially changed in terms of its opacity in any desired manner.

In this case, it is particularly advantageous if the image of the vehicle and/or 3D objects for representing the vehicle function which are related to the image is/are changed on the basis of a selection of an operating element relating to a vehicle function. Such a selection can be manually made by a user but can also be made automatically, for example, during initialization after the current overall representation has been called. In this embodiment, comfort and safety functions which are usually controlled purely using lists and icons can be enriched in a particularly advantageous manner by three-dimensional visualization of the function. Provision may be made for the viewing angle and the position and opacity of the image, that is to say of the three-dimensional vehicle model, to be dynamically adapted during operation in order to be able to better visualize the function. If it is a function based on the steering system, for example, the vehicle can be turned such that it is viewed from the front, the windshield can become at least partially transparent and the steering wheel can be displayed in a highlighted manner, for example also using a different color.

In this context, it is particularly advantageous if the representation is also changed on the basis of the evaluation of at least one current operating parameter of the vehicle function and/or an operating parameter of the vehicle function to be set. Current operating parameters which can be retrieved using a vehicle bus for example can therefore be taken into account in order to adapt the scene and therefore the 3D representation. A type of preview can also be generated with respect to selected adjustment options which have not yet been actuated, which preview can better convey the technical issues in the overall context of the vehicle. It is therefore possible to achieve a more in-depth representation which represents actual states and/or effects and provides the operator with excellent support.

At least one further 3D object and/or 2D overlay can be expediently selected on the basis of the vehicle function and/or the evaluation and can be inserted into the scene or the representation in a relationship with respect to the vehicle which depicts the vehicle function. If the air-conditioning system or a current setting/setting to be made is intended to be visualized, for example, arrows are suitable as additional objects. Light cones and the like can additionally be displayed for lighting systems. A traffic sign can additionally be displayed for traffic sign detection. A multiplicity of possibilities are clearly conceivable.

Within the scope, provision may also be generally made for at least one 2D object on a 2D plane to be inserted into the 3D representation, in particular a text-based object and/or an icon. In this variant, at least one 2D layer and at least one 3D layer are therefore mixed, with the result that conventional 2D elements which are still present, such as lists, text, icons and the like, need not be rendered in a three-dimensional manner, for example, but can be separately provided as a 2D plane (layer). The 3D representation which has been rendered forms a 3D plane (3D layer). Both planes can now be combined and displayed in a superimposed manner. A type of "optical mixing" of the layers is therefore carried out in the display.

Specifically, provision may be made in this case for the 2D plane to be combined with the 3D representation after the latter has been rendered, the 2D plane or the 3D representation, in particular, forming the background, in which case the 3D representation or the 2D plane, in particular, is displayed in an at least partially transparent manner. A plurality of 2D planes and/or 3D representations are also conceivable within the scope of the proposals. Different possible forms of the "optical mixing" described therefore result. A 2D plane can therefore be implemented, in particular, in an at least partially transparent manner against a 2D background or else a 2D plane can be implemented, in particular, in an at least partially transparent manner against a 3D background. It is also possible to have a 3D representation, in particular, in an at least partially transparent manner against a 2D background or to have a 3D representation, in particular, in an at least partially transparent manner against a 3D background.

In addition to the method, the inventors also propose a device for generating a 3D representation of a user interface in a motor vehicle, which device comprises a computing device for carrying out the proposed method. Such a device is therefore part of a vehicle, in particular a motor vehicle, which also contains a display device, in particular a display, on which the 3D representation can be displayed. An operating device is then also assigned to the display device in order to receive inputs from an operator. All statements made with respect to the method can be analogously applied to the device, with which the same advantages are therefore obtained.

BRIEF DESCRIPTION OF THE DRAWINGS

These and other objects and advantages of the present invention will become more apparent and more readily appreciated from the following description of the preferred embodiments, taken in conjunction with the accompanying drawings of which.

Figure 1:
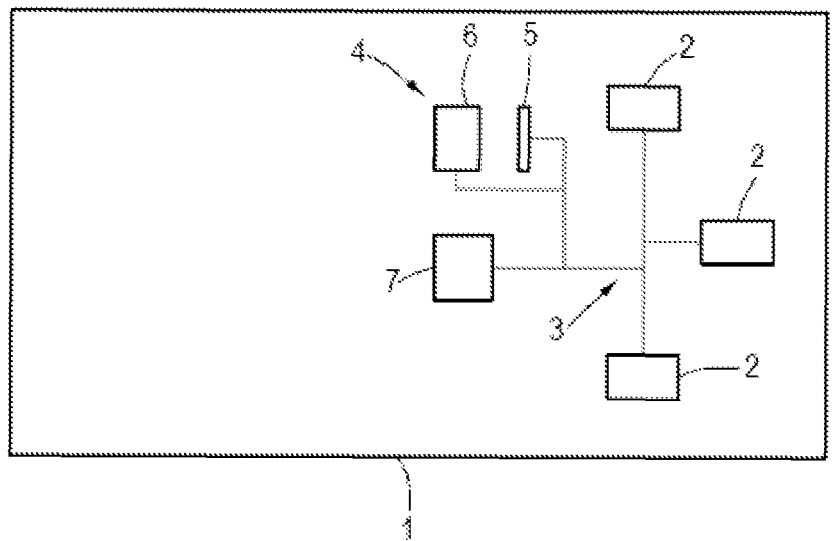
FIG. 1 shows a motor vehicle having a proposed device.

DETAILED DESCRIPTION OF THE
PREFERRED EMBODIMENT

Reference will now be made in detail to the preferred embodiments of the present invention, examples of which are illustrated in the accompanying drawings, wherein like reference numerals refer to like elements throughout.

FIG. 1 shows a basic sketch of a motor vehicle 1. The latter comprises a plurality of vehicle systems 2 (indicated only schematically here), for example driver assistance systems and the like, which communicate with one another via a bus system 3, here a CAN bus. So that a driver can make adjustments and can retrieve information, the motor vehicle 1 also comprises an infotainment system 4 which, in addition to a display device 5 which is in the form of a display here, also comprises a corresponding operating device 6 with operating elements. The display can also be in the form of a touchscreen.

A proposed device is also implemented using a computing device 7 as part of the infotainment system 4; this means the computing device 7 is designed to carry out the method in order to generate 3D representations for the display device 5.

Figure 2:
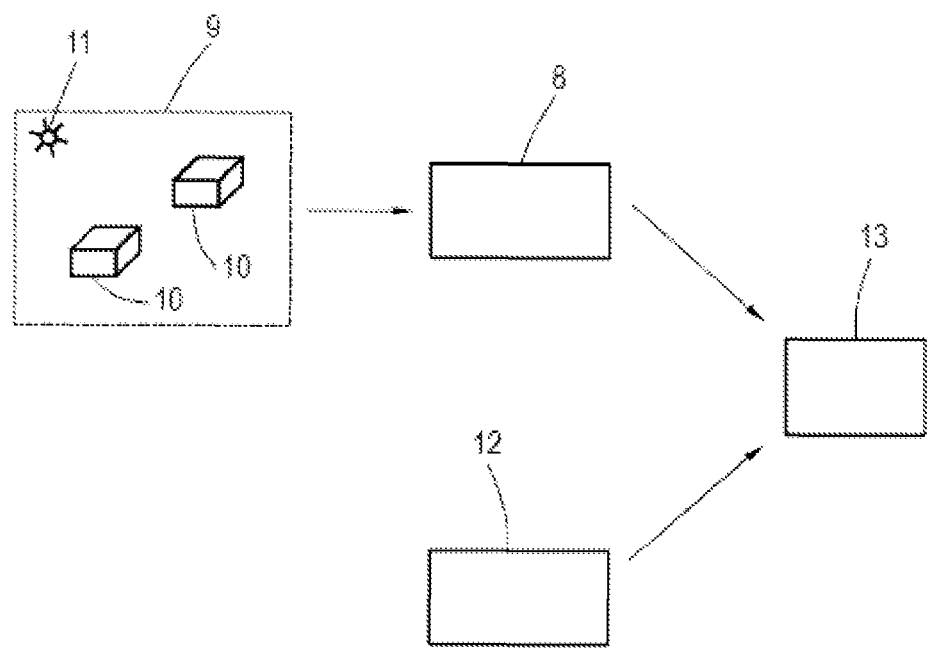
FIG. 2 shows a sketch for carrying out the proposed method.

In the exemplary embodiment illustrated here, two-dimensional and three-dimensional contents (layers) are combined in this case, as shall be explained in more detail using FIG. 2.

The computing device 7 is therefore first of all designed to determine a 3D representation 8 by rendering. The starting point for this is a scene 9, therefore a virtual spatial model, in which 3D objects 10 are assigned to positions, material properties and opacities depending on a current operating state. The positions of virtual light sources 11 and a viewing direction and position of an observer are also defined. By rendering, this scene 9 is projected onto a two-dimensional image plane, thus producing the 3D representation 8.

In addition, it is also possible to provide at least one 2D plane 12 (2D layer) which comprises two-dimensional elements which do not need to be rendered, such as text, lists and the like. The 2D plane 12 and the 3D representation 8 are placed on top of one another as layers, in which case the layer which does not form the background can be at least partially transparent. Overall, a user interface 13 which is to be represented and is displayed on the display device 5 then results.

The 3D objects 10 and two-dimensional elements to be represented, their position, orientation, opacity and scaling, the viewing direction and the light sources result in this case from the current operating state and additional data, as shall be explained in more detail below using examples.

Figure 3:
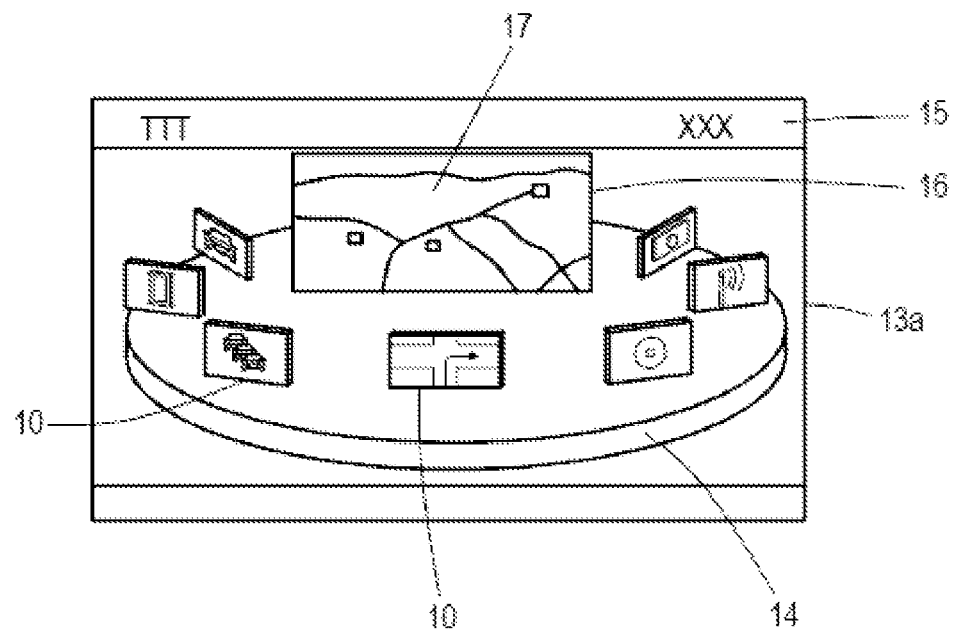
FIG. 3 shows a first example of a resulting user interface.

FIG. 3 shows a first example of a resulting user interface 13*a*. It is possible to see a selection menu, the menu items of which are each represented by 3D objects 10, here small plates, on which a symbol is depicted and which are situated on a round tablet 14 floating in space. The status bar 15 which can be seen in the upper region may be part of the 2D plane 12.

The centrally located 3D object 10 appearing closest to the viewer corresponds to the menu item which is in focus just now, and therefore has been selected. A preview 17 for this menu item is displayed on a screen-like preview object 16 arranged in the scene 9 in the center of the tablet 14, which would be shown by the user interface 13*a* if the menu item were selected. Since a navigation function has been selected in the present case, that is to say is in focus, a map can be seen in the preview 17.

This map is very up-to-date in the present case; this means up-to-date data, here a position of the motor vehicle 1 and/or a status of a navigation system, are queried by the computing device 7 via the bus system 3 and are used to give a preview 17 which is as up-to-date as possible. This preview may also be moving, that is to say animated, in particular, that is to say is continuously kept up-to-date, just like the user interface 13a is kept up-to-date by rendering in real time.

It goes without saying that it is also conceivable to implement the preview 17 using a stored image, for example an image stored during the last use, or a default image.

If the user carries out an operating action, for example scrolling further in the menu, an animated 3D representation 8 is generated, in which the tablet 14 rotates further to the next menu item and the latter comes into focus. The preview 17 is then also updated accordingly.

Figure 4:
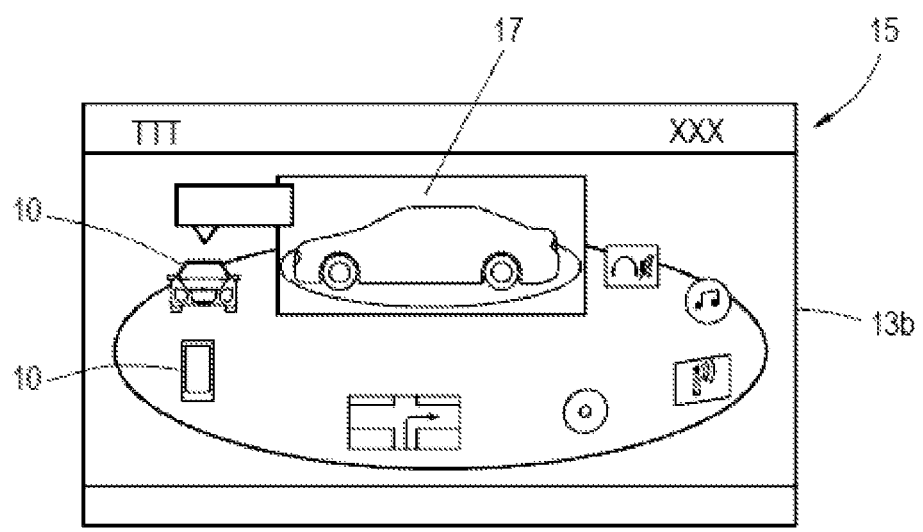
FIG. 4 shows a second example of a resulting user interface.

An easily modified embodiment shows the user interface 13b according to FIG. 4. The latter again illustrates a menu in the form of different 3D objects 10. The motor vehicle object is in focus here, indicated using colors, whereas a preview 17 is shown again as a 3D texture in the center.

Figure 5:
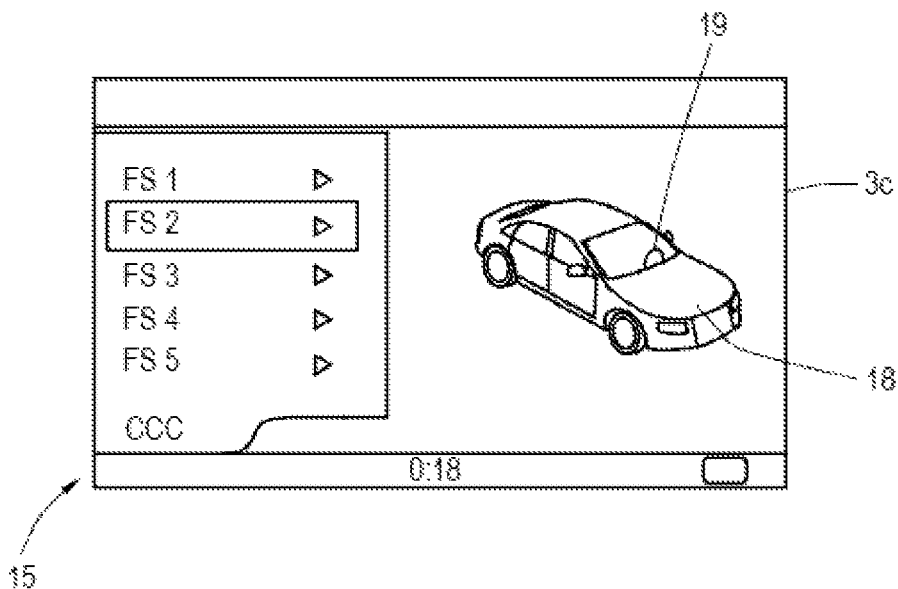
FIG. 5 shows a third example of a resulting user interface.

FIG. 5 shows another example of a user interface 13c which can be generated using the method. In this case, in addition to a status bar 15, a text-based menu is also generated as part of the 2D plane 12, whereas an image 18 of the motor vehicle 1 is used as the 3D object 10, however. In the menu illustrated on the left-hand side, different driver assistance systems (FS) are offered for adjustment. The selected driver assistance system FS2 which is not indicated in a transparent manner but has a color border relates to the steering system of the motor vehicle 1, which is why the image 18 of the motor vehicle 1 has been adapted such that there is a top view from the front, the windshield appears transparent and the steering wheel 19 can be seen in a clearly emphasized manner.

If a traffic sign detection system is selected, a traffic sign can be inserted into the scene 9 as an additional 3D object 8, and light cones and the like can be inserted in the case of headlight systems.

Figure 6:
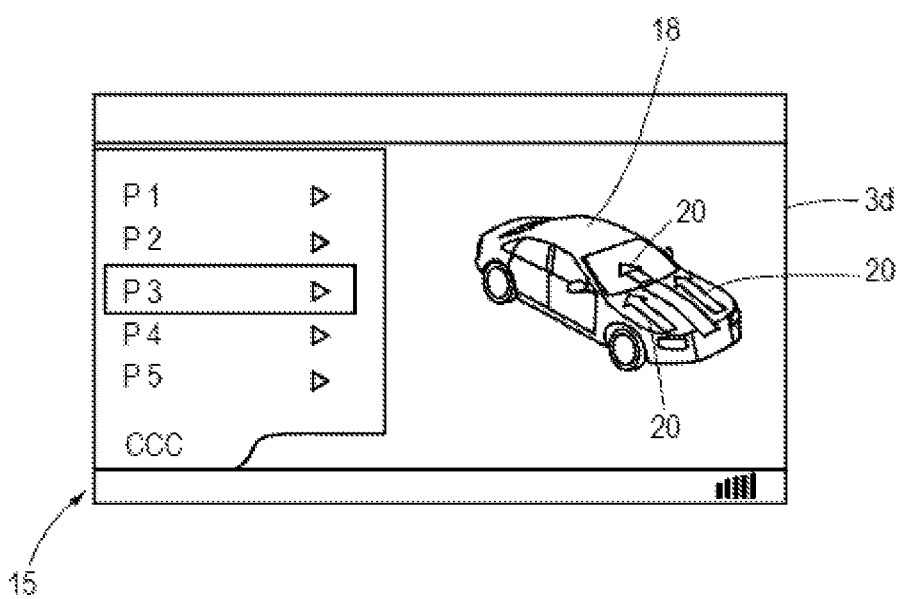
FIG. 6 shows a fourth example of a resulting user interface.

FIG. 6 finally uses the user interface 13d to show a further possible implementation, here in the case of adjustment of the air-conditioning system. Arrows 20 are superimposed (as "overlays") on the image 18, which arrows illustrate the current operating state of the air-conditioning system and were therefore determined on the basis of at least one operating parameter obtained from the bus system 3 and were added to the scene 9. The current state therefore becomes more apparent to an operator.

However, it is also conceivable to more clearly emphasize the effects of an adjustment option (P) in focus by adapting the 3D representation in real time if the adjustment option comes into focus or even specific parameters are proposed.

Another example in which such a display of a current state or preview state of a vehicle system is useful is a lighting system. In this case, light cones can be added to the scene 9 as further 3D objects 10 in order to indicate how the illumination would look with the current operating parameters or operating parameters to be set and the like.

It is also noted at this point that it is fundamentally possible, within the scope, to also configure any desired objects of the 3D objects to be moving in order to improve the 3D representation and therefore the user interface 13 to that effect.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for generating a three-dimensional (3D) representation for a user interface displayed in a vehicle, the method comprising:

storing a 3D model for each of a plurality of 3D objects;

rendering, using a vehicle integrated computing device including a renderer, the plurality of 3D objects, the 3D objects being rendered in situ such that the renderer in the vehicle shifts the positions of the 3D objects with respect to one another thereby generating two-dimensional (2D) image data or 2D animation data from the 3D model for a moving scene; and displaying the moving scene including the 2D image data or 2D animation data on the user interface, wherein the user interface comprises a menu having a plurality of menu items represented by the plurality of 3D objects, a preview object is incorporated into the moving scene, separately from the plurality of menu items, for a currently active menu item among the plurality of menu items, the preview object being displayed in one preview object area of the user interface shared by the plurality of menu items, and the preview object comprises a two-dimensional preview that is a screen replication of another user interface screen that would appear after selection of the currently active menu item, the preview object comprising the two-dimensional preview that is the screen replication of the another user interface screen being update-able by rendering the preview object in real-time.

2. The method as claimed in claim 1, wherein a user operating action produces a user input, and upon receipt of the user input, the scene is changed and the at least one 3D object is rendered again.

3. The method as claimed in claim 2, wherein the plurality of 3D objects are rendered again in real time.

4. The method as claimed in claim 2, wherein the moving scene is changed by at least one of rotating, translating, scaling and changing opacity of the 3D objects and/or by adding or removing a temporary 3D object.

5. The method as claimed in claim 1, wherein the 3D objects are presented as if they were on a turntable, as different menu items are activated, the 3D objects are rotated about a center of the turntable, and the 3D objects are rendered again as they rotate to change scaling and angle of illumination.

6. The method as claimed in claim 1, wherein a 3D texture is incorporated into the 3D object corresponding to the currently active menu item.

7. The method as claimed in claim 1, wherein the preview object is arranged behind the currently active menu item from a viewing direction of the moving scene.

8. The method as claimed in claim 1, wherein the preview object is calculated using up-to-date data, and while the preview object is presented, the preview object is kept up-to-date with changing conditions.

9. The method as claimed in claim 1, wherein a stored representation of the user interface screen which was displayed when the currently active menu item was last selected is used for the preview object, or if the currently active menu item has not yet been selected, a stored default representation is used for the preview object.

10. The method as claimed in claim 1, wherein at least one 3D object comprises a 3D image of the vehicle.

11. The method as claimed in claim 10, wherein
a user operating action produces a user input relating to a vehicle function, and
the 3D image of the vehicle is changed based on the user input relating to the vehicle function.

12. The method as claimed in claim 11, wherein the 3D image of the vehicle is also changed based on a current operating state of the vehicle function.

13. The method as claimed in claim 11, wherein the 3D image of the vehicle is changed by at least one of:
rotating the 3D image of vehicle to reveal the vehicle function, and
making transparent a portion of the 3D image of vehicle to reveal the vehicle function.

14. The method as claimed in claim 11, wherein the 3D image of the vehicle is changed by adding a further 3D object to the vehicle to depict the vehicle function.

15. The method as claimed in claim 1, wherein
a 2D object on a 2D plane is inserted into the 3D representation, and
the 2D object is a text-based object and/or an icon.

16. The method as claimed in claim 15, wherein
the 2D plane is combined with the 3D representation using an overlay method, after the 3D representation has been determined,
one of the 2D plane and the 3D representation forms a background, and
another of the 2D plane and the 3D representation forms a foreground and is displayed in a partially transparent manner.

17. The method as claimed in claim 1, wherein generating the 2D image data or 2D animation data from the 3D model for the moving scene comprises moving the plurality of objects with respect to a fixed point in the moving scene.

18. The method as claimed in claim 1, wherein the preview object comprising the two-dimensional preview of the user interface screen is update-able by rendering the preview object in real-time based on operating parameters of the vehicle which are received by the vehicle integrated computing device via a bus system of the vehicle.

19. A device to generate a three-dimensional (3D) representation of a user interface displayed in a vehicle, the device comprising:
a memory to store a 3D model for each of a plurality of 3D objects;
a vehicle integrated computing device including a renderer configured to render the plurality of 3D objects, the 3D objects being rendered in situ such that the renderer in the vehicle shifts the positions of the 3D objects with respect to one another thereby generating two-dimensional (2D) image data or 2D animation data from the 3D model for a moving scene; and
a display device which displays the moving scene including the 2D image data or 2D animation data on the user interface,
wherein
the user interface comprises a menu having a plurality of menu items represented by the plurality of 3D objects,
a preview object is incorporated into the moving scene for a currently active menu item among the plurality of menu items,
the preview object is displayed in one preview object area of the user interface shared by the plurality of menu items,
the preview object comprises a two-dimensional preview that is a screen replication of another user interface screen that would appear after selection of the currently active menu item, and
the preview object comprising the two-dimensional preview that is the screen replication of the another user interface screen is update-able by rendering the preview object in real-time.

\* \* \* \* \*